United States Patent [19]

Ho

[11] Patent Number: 5,730,515
[45] Date of Patent: Mar. 24, 1998

[54] SLIDING CASE MOUNTING STRUCTURE

[76] Inventor: Hsin Chien Ho, 20F-1, 268, Sec. 1, Wen-Hua Road, Pan Chiao City, Taipei, Taiwan

[21] Appl. No.: 690,179

[22] Filed: Jul. 25, 1996

[51] Int. Cl.⁶ .................................................. H05K 5/02
[52] U.S. Cl. .................. 312/350; 312/334.7; 361/727; 361/802
[58] Field of Search ................... 312/350, 311, 312/334.7; 361/610, 685, 725, 726, 727, 796, 802

[56] References Cited

U.S. PATENT DOCUMENTS

| 1,414,858 | 5/1922 | Brown | 312/334.7 X |
|---|---|---|---|
| 2,004,025 | 6/1935 | Van Voorst, Jr. | 312/334.7 X |
| 3,266,860 | 8/1966 | Moore et al. | 312/350 |
| 3,470,420 | 9/1969 | Marks | 361/802 |
| 3,851,943 | 12/1974 | Afful | 312/350 X |
| 4,232,921 | 11/1980 | Peele | 312/350 |
| 4,319,792 | 3/1982 | Britt et al. | 312/350 X |
| 4,866,576 | 9/1989 | Ametsu et al. | 361/802 X |
| 5,247,427 | 9/1993 | Driscoll et al. | 361/685 |
| 5,262,923 | 11/1993 | Batta et al. | 312/334.7 X |
| 5,584,396 | 12/1996 | Schmitt | 361/727 X |

FOREIGN PATENT DOCUMENTS 718629  3/1942  Germany .......................... 312/334.7

Primary Examiner—James R. Brittain
Assistant Examiner—Hanh V. Tran
Attorney, Agent, or Firm—Pro-Techtor International

[57] ABSTRACT

The improved sliding case mounting structure for computers includes multiple horizontal arrays of hollow circular mounting elements on the inner side walls of a compartment of the computer for receiving disk drives which may be smoothly slided along the circular mounting elements. Good grounding effects may also be achieved.

2 Claims, 5 Drawing Sheets

SLIDING CASE MOUNTING STRUCTURE

BACKGROUND OF THE INVENTION (a) Field of the Invention

The present invention relates to a sliding case mounting structure, and more particularly to a mounting structure for computers.

(b) Description of the Prior Art

In the design of equipment or apparatus, such as computers or high fidelity systems, the trend is to make their internal components expandable or replaceable. Computer mainframes, particularly, are generally designed to be expandable and replaceable. The mainframes are being slided along rails or tracks to facilitate their mounting or removal. However, in the conventional method of mounting or removing the mainframe, a plurality of level plate-like rails transversely project from the side walls of the mainframe housing so that read and write devices such as floppy disk drives and optical disk drives may be horizontally slided along the rails on the lateral side walls of the mainframe housing into or out of the mainframe housing. Screws are also used to pass from the outside of the mainframe housing into pre-formed holes and locked into the disk drives themselves for positioning purposes. The drawback with such method is that it is necessary to remove the screws first before replacing or removing the disk drives. Besides, good grounding effect cannot be achieved, and the molding cost is high.

In order to solve the above problems, the inventor of the present invention disclosed a "Sliding Case Mounting Device" in U.S. Ser. No. 08/606,022 filed on Aug. 29, 1996. In said invention, it is provided a speedy and efficient method of removal or positioning disk drives to achieve good grounding effect and quick assembly. The device taught in said invention essentially comprises a pair of symmetrical guiding means each including hook elements having their bottom sides up and hooking the screw holes at the downwardly facing bottom side of a positioned disk drive body, and pins projecting inwardly at the upper portion of the guiding means engaging the square screw holes at the side walls of the positioned body such that the guiding means is attached thereonto. The body and the guiding means are together pushed into a mounting slot of the mainframe, and the hook elements slide along the slots and are automatically engaged. Such a device is adapted for use in computer mainframe housings with horizontal plate-like mounting rail structures.

However, although the above-mentioned invention has improved on the conventional mounting method, the inventor further filed a patent application on Aug. 2, 1996 for an improved mounting structure under U.S. Ser. No. 08/600,098. In both inventions by the inventor of the present invention, since linear rails or tracks punched from the housing walls will have a end surface at the front end of each rail, movement of the disk drive body or the like along the rails may be obstructed, and the grounding effect is still not very satisfactory.

SUMMARY OF THE INVENTION

Accordingly, a primary object of the present invention is to provide an improved sliding case mounting structure in which curved or rounded rails are provided to provide smooth sliding effects and better grounding effects.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
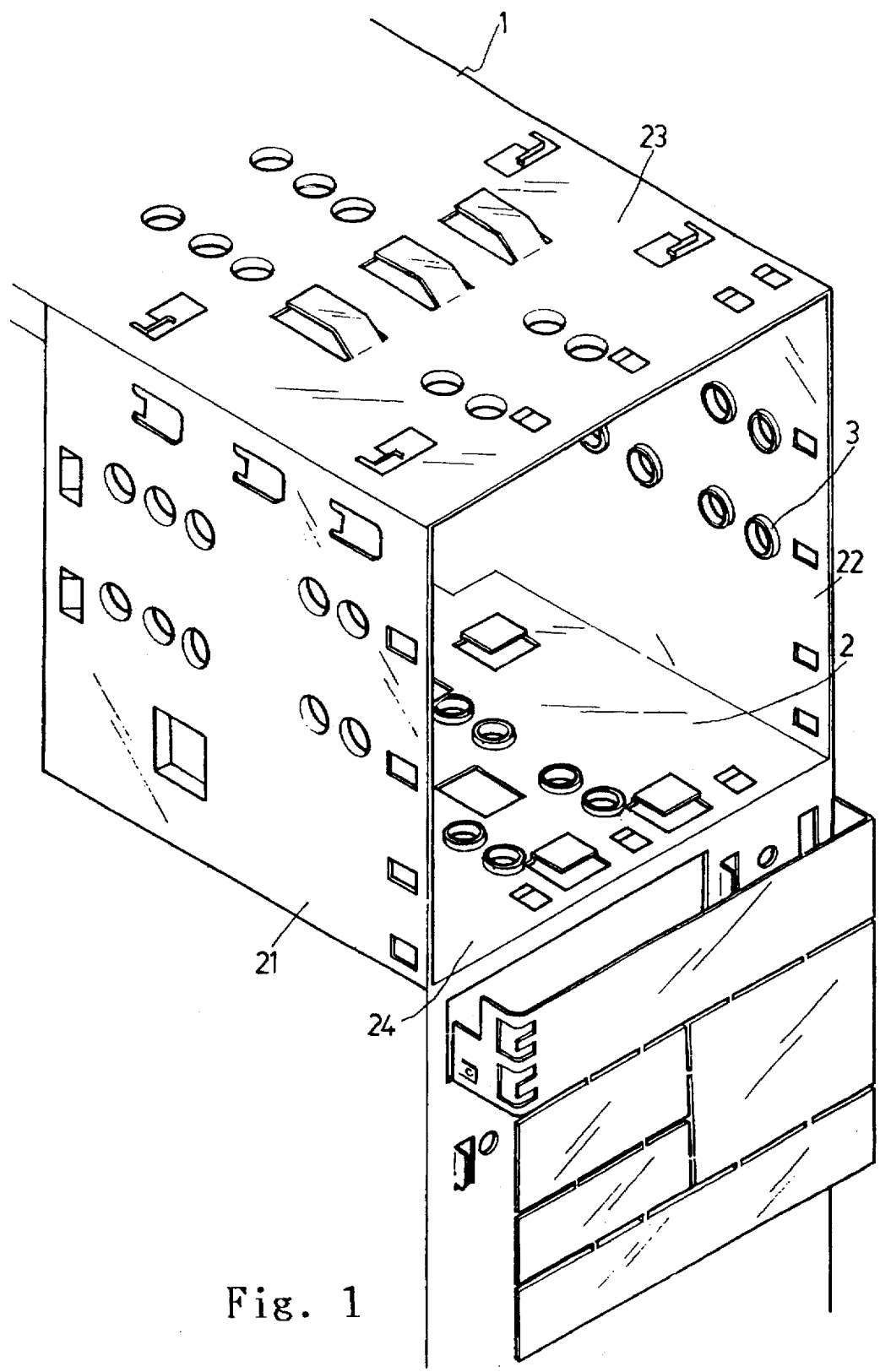
FIG. 1 is an elevational view of the mounting structure of the invention for use in an upright type computer housing.

With reference to FIGS. 1, 2, 3 and 4, a mainframe housing 1 has a compartment 2 for accommodating read-and-write devices such as floppy disk drives and optical disk drives, the compartment 2 having two symmetrical side walls 21 and 22. The mounting structure according to the present invention essentially comprises a plurality of horizontal arrays of hollow circular mounting elements 3 being provided to project from the respective inner sides of the side walls 21 and 22 such that guiding means 5 on a disk drive case 4 may slide smoothly along the circular mounting elements 5 for positioning or removal purposes (see FIG. 3) while generating good grounding effects.

Figure 2:
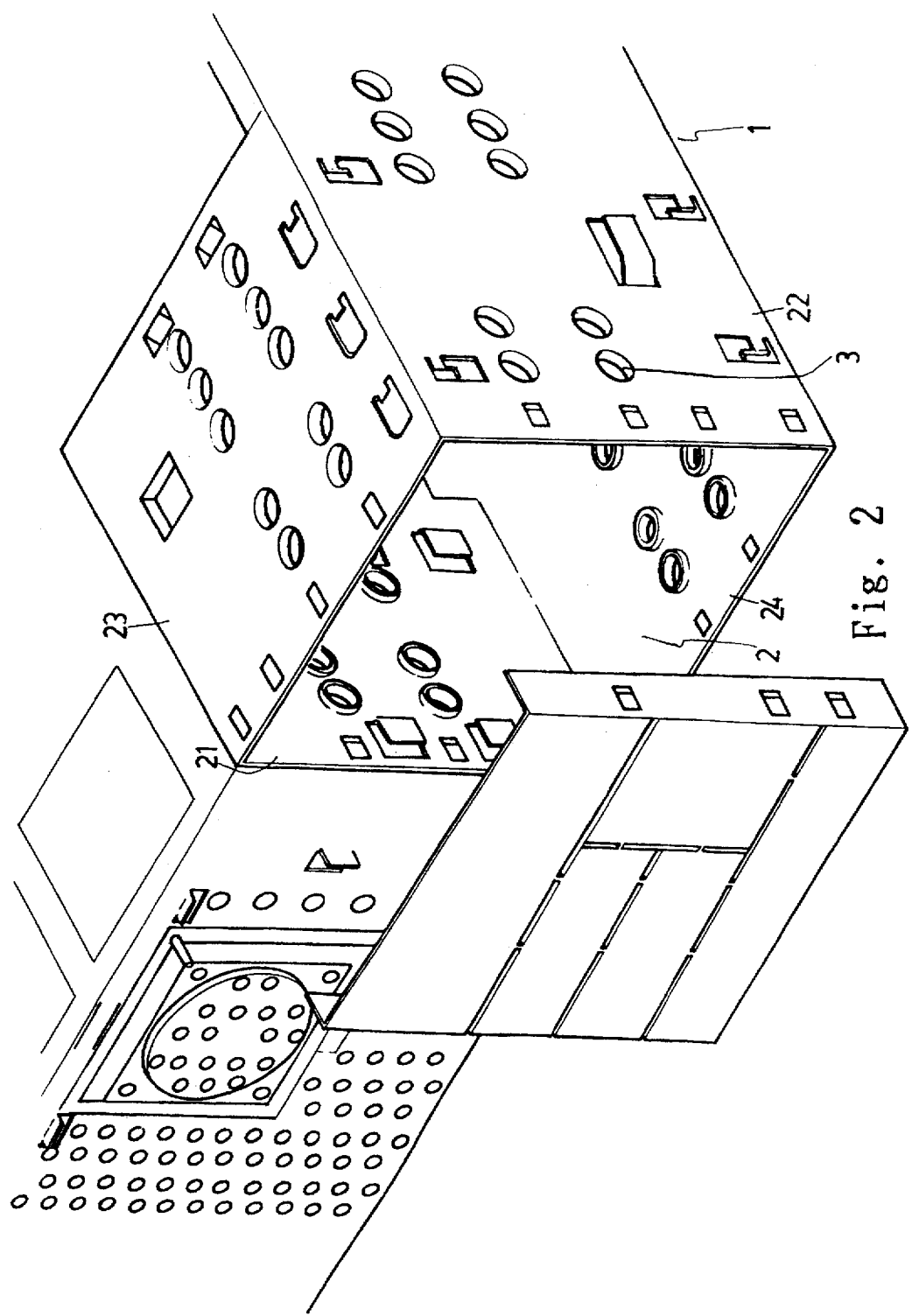
FIG. 2 is an elevational view of the mounting structure for use in a horizontal type computer housing.
Figure 3:
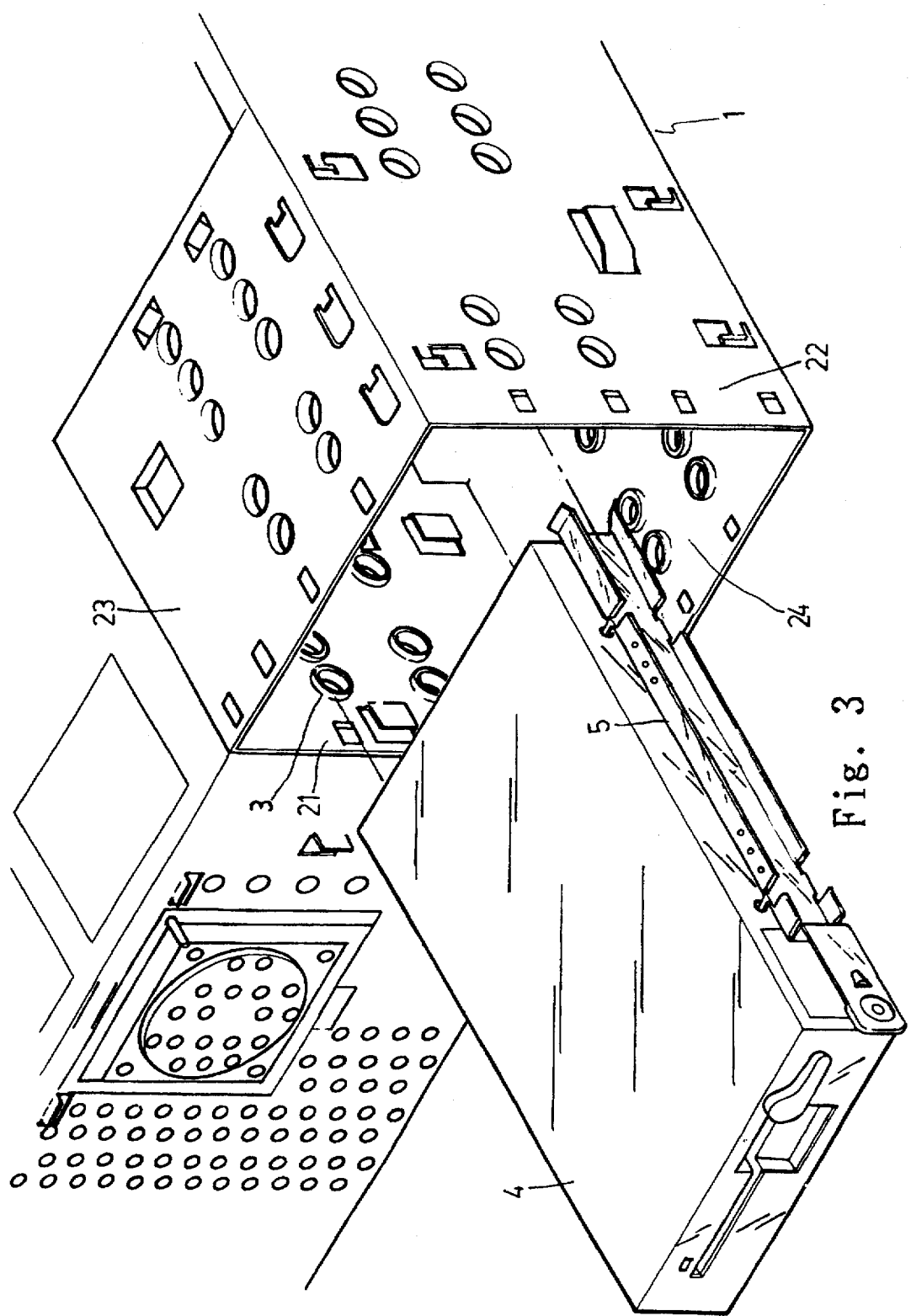
FIG. 3 is an elevational view showing a disk drive to be mounted in the housing.
Figure 4:
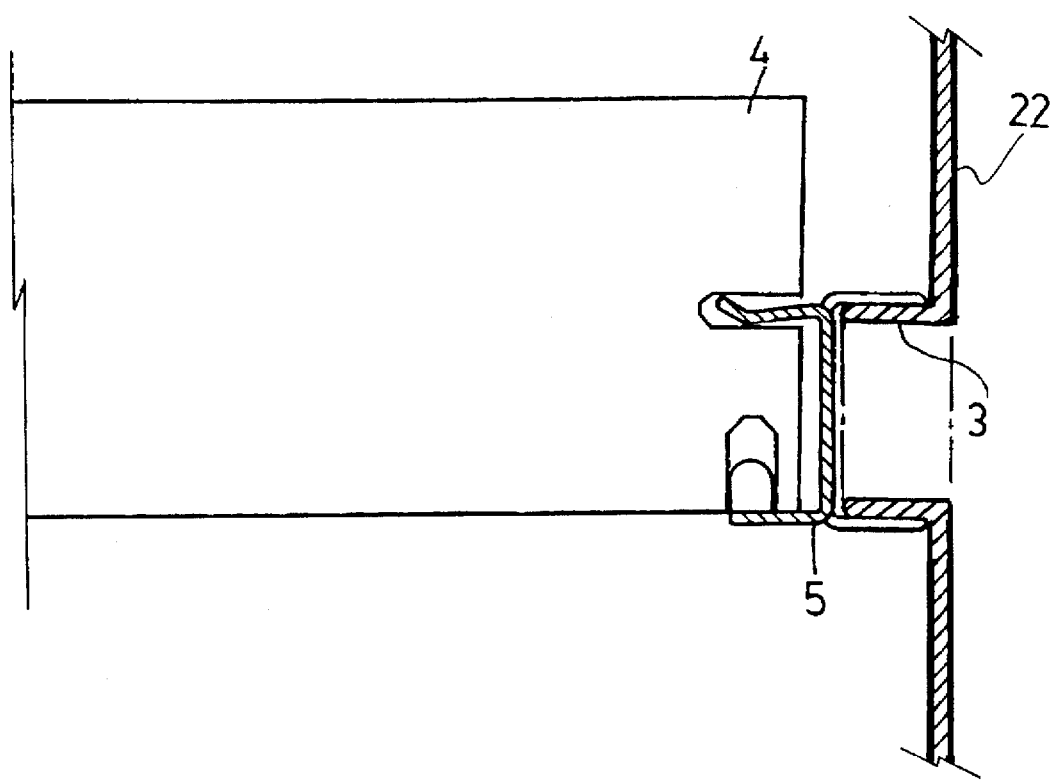
FIG. 4 is a sectional view of the mounting structure of the invention.
Figure 5:
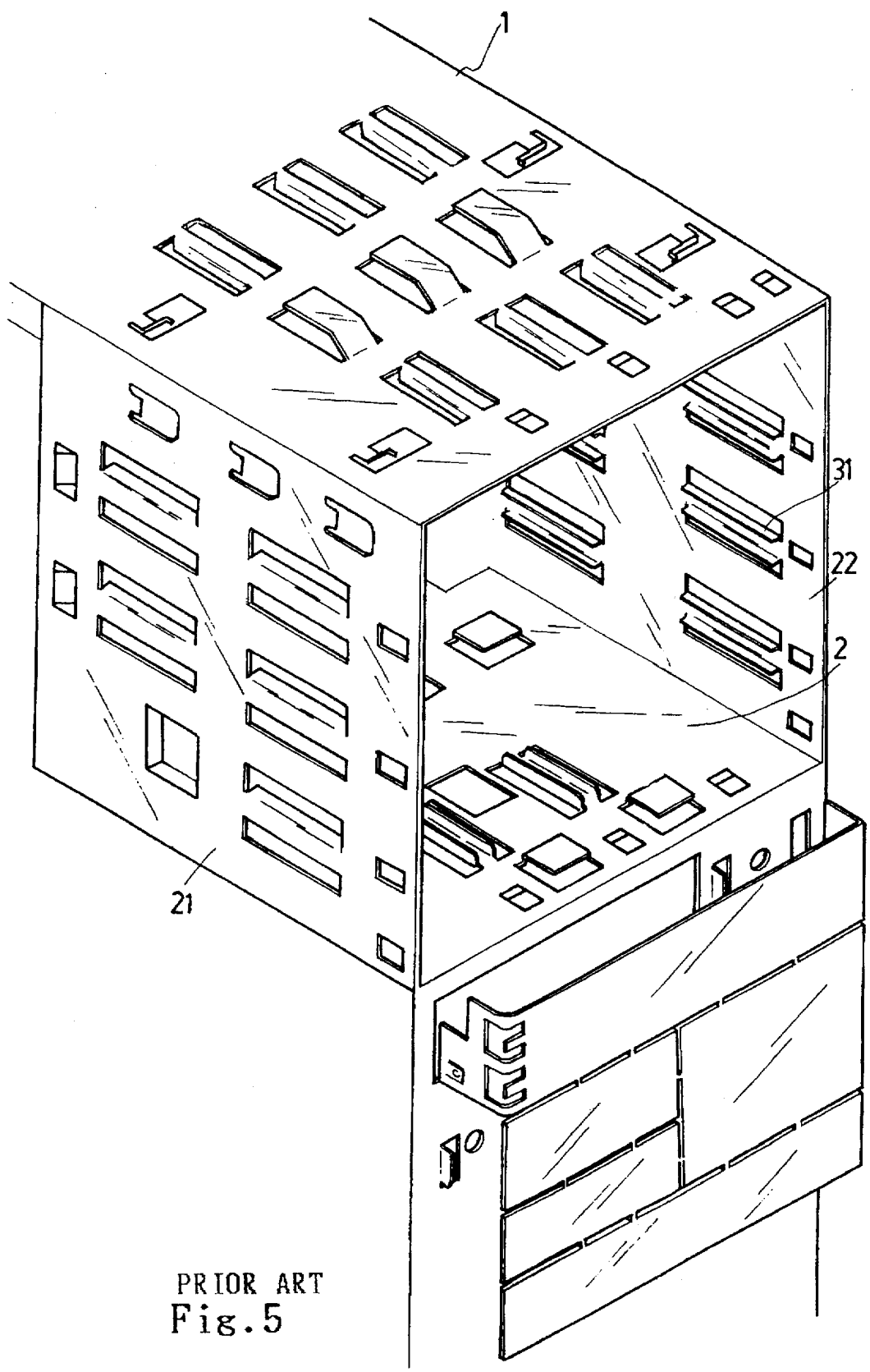
FIG. 5 is an elevational view of the prior art used in an upright type computer housing.

In the present invention, the circular mounting elements 3 may also be provided on the inner sides of a top side wall 23 and a bottom side wall 24 of the housing 1 to enable the present invention to be used in both upright type and horizontal type computer housings (as shown in FIGS. 1 and 2).

Although the present invention has been illustrated and described with reference to the preferred embodiment thereof, it should be understood that it is in no way limited to the details of such embodiment but is capable of numerous modifications within the scope of the appended claims.

What is claimed is:

1. A sliding case mounting structure comprising:

a plurality of horizontal arrays of hollow cylindrical mounting elements having walls projecting from inner sides of two symmetrical lateral side walls of a compartment of a mainframe housing, said walls of said mounting elements are orthogonal to said side walls of said compartment, said mounting elements accommodate floppy disk drives and optical disk drives, such that guiding means of a disk drive may slide smoothly along an outer perimeter surface of said cylindrical mounting elements during positioning and removal of the disk drive, such that good grounding effects are achieved.

2. The mounting structure as claimed in claim 1, wherein: further arrays of said cylindrical mounting elements are provided on inner sides of a top side wall and a bottom side wall of said mainframe housing so that said mounting structure is adapted for use in both upright and horizontal computer housings.

* * * * *